Aug. 27, 1940.   E. G. B. DE MANGHI   2,212,592
WHEEL
Filed Dec. 6, 1938
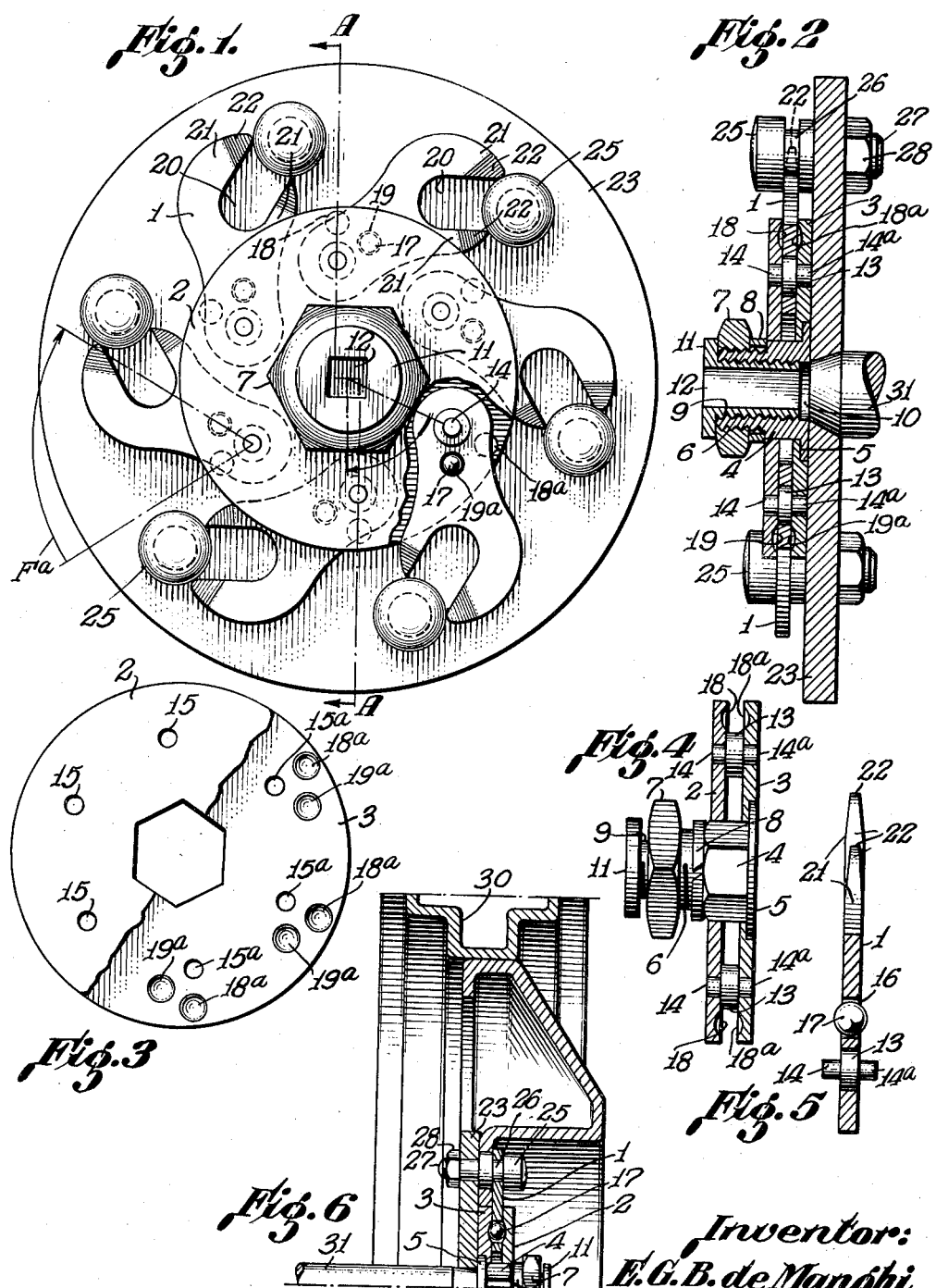

Patented Aug. 27, 1940

2,212,592

UNITED STATES PATENT OFFICE 2,212,592

WHEEL

Elda Graciana Bergolli De Manghi,
Buenos Aires, Argentina

Application December 6, 1938, Serial No. 244,300

5 Claims. (Cl. 301—9)

This invention relates to a device adapted for removably coupling the road wheels to the axles of automotive vehicles in general, and particularly to a device of this type which provides a combination of elements so arranged that a simple turn of a common wrench will cause the instantaneous coupling or uncoupling of the wheels.

The device of the present invention is based on a simple arrangement of elements which may be adapted to the wheels of any of the numerous existing types of vehicles.

The device comprises mainly a plurality of radial latching elements connected pivotally between stop discs arranged parallel to each other and centrally screw-connected to check elements. One of said check elements constitutes the means for setting the latching elements in operating position. The latching elements are constituted by suitably shaped irregularly curved plates, having the ends thereof, opposite to those connected between the stop discs, fork-shaped.

A further feature of this invention resides in that the latching elements are provided, towards the end thereof adjacent to that connected between the stop discs, with a detent member in latching position. Said detent members are constituted by a ball having a diameter larger than the thickness of the plates constituting the latching elements, so as to project from both faces of said plates and fit in sockets formed in the opposed faces of the stop discs, said balls constituting, in conjunction with the sockets, means for neutralizing the effects of the inertia produced when starting the vehicle backwards or upon braking same, said movements affecting the coupling device with a torque in a direction opposite to the rotary motion by which the latching is established, which would result in the latching elements becoming loose from the points of connection, with the corresponding sudden uncoupling of the wheels. The connecting or fitting points for the latching elements are constituted by bolt heads projecting normally to the axle flange, said bolt heads being provided with an annular groove or throat in which are forced both branches of the fork-like end of the latching elements.

In order that the invention may be more clearly understood and readily carried into practice, it has been illustrated by way of example and in a preferred embodiment in the accompanying drawing, wherein:

Figure 1 is a plan view of the assembly constituting the coupling device.

Figure 2 is a cross sectional view taken on the line A—A of Figure 1.

Figure 3 is a plan detailed view of the stop discs, one of each is shown broken away.

Figure 5 is a sectional view of the stop discs showing the manner in which they are connected to each other.

Figure 5 is a side sectional view of one of the latching elements with its corresponding checking and detent element.

Figure 6 is a side sectional view showing the manner in which the wheel is coupled to the axle flange by means of the coupling device of the present invention.

The same reference characters indicate like or corresponding parts or elements throughout the drawing.

Referring now to Figures 1 to 5, the device of the present invention comprises a plurality of latching elements constituted by plates 1, of curved profile, connected pivotally and in radial alignment between the stop discs 2—3 located on both sides of the elements 1 and centrally connected to each other by means of a group of check elements. As shown in Figs. 2 and 3, said check elements are constituted by an outer nut 4 which engages the inner face of the disc 3 by means of a flange 5, and projecting to the outer face of the disc 2, from where it extends in an outwardly threaded extension 6 on which a check nut 7 is screwed, with the interpolation of a suitable split washer 8. Said split washer has one of its split ends slightly raised and constitutes a resilient element for the purpose which will be described hereinafter.

The check-nut 7 is held on the extension 6 by means of a bushing 9 screwed in the central socket 10 of the nut 4 and associated extension 6, the upper end of the bushing being provided with a flange 11 which presses the head of the check-nut 7, thus eliminating any possibility of the latter becoming loose from the extension 6. The bushing 9 has a hole 12 of quadrangular or hexagonal section, in order to enable the adjustment thereof to the nut 4 by means of an ordinary tubular wrench.

The connection of the elements 1 between the stop discs 2—3 is effected by means of members comprising an enlarged annular portion 13 and two pins 14, 14a coaxially projecting from both faces of portion 13, the coupling of said pins to the stop discs being effected by simple insertion in axial coinciding perforations 15, 15a suitably distributed in the middle portion of the discs 2, 3, the portion 13 of said members forming the rotation point of the elements 1, which are freely mounted thereon.

The end of each element 1 adjacent to the pivoted end is provided with a perforation 16 for the purpose of freely receiving a ball 17, the diameter of which is larger than the thickness of said elements, so that said ball 17 projects equidistantly from both faces of the elements in order to fit in aligned sockets 18, 18a and 19, 19a provided at different angles in the discs 2, 3. The pair of sockets 18, 18a serves to retain the balls 17 in the plates 1 in operative latching position, while the pair 19, 19a serves to keep the plates in unlatched inoperative position with respect to the bolts of the axle flange.

The ends 20 of the plates 1, opposite to the ends connected to the discs 2, 3 are fork-shaped. The branches 21 of said forks 20 have suitably tapered ends 22, and this arrangement is adapted to force the branches 21 in the respective grooves or throats of the check bolts projecting from the axle flange, in the manner which will be described hereinafter.

The coupling of the vehicle wheels is carried out as follows, in accordance with the embodiment shown in Figure 6: The wheel flange is first coupled to the hub flange 23 of the vehicle axle which, as shown in Figure 6 is provided with a plurality of fixed bolts 24 suitably distributed towards the outer edge thereof. The entire contour of the stems of said bolts is coaxially grooved so as to be secured better to the flange, and the heads 25 of the bolts are provided with an annular groove 26 constituting a throat for receiving the fork-shaped ends of the elements 1 arranged in line with said heads, said bolts being fixed to the flange 23 by means of individual check-nuts 28 screwed to the threaded ends 27 of said bolts. Once the hub 29 of the tire 30 has ben coupled to the flange 23 of the axle 31, by inserting said hub 29 on the heads 25 of the bolts 24, the above described device is applied to the central portion of the hub, with the elements 1 virtually folded against the periphery of the discs 2, 3, Figure 1, in which position the forked ends 20 face the grooves 26 of the heads 25 in alignment, and by engaging the check-nut 7 with an ordinary wrench, said check-nut establishes an adjustment by means of the nut 4, rotating the latter together with the discs 2, 3 in the direction indicated by the arrow F, while the elements 1 upon the branches 21 thereof engaging the grooves 26, are angularly displaced in the direction indicated by the arrows Fa in Figure 1, forcibly fitting in the grooves 26, said forced fitting being caused by the tapered ends 22 of the branches 21, which cause a wedged fitting. Upon the elements 1 being angularly displaced as described above, the ball 17 of each of these elements passes from the group of sockets 19, 19a, to the sockets 18, 18a, thus causing a firm detention of the elements in latching position, and consequently the secure coupling of the wheel.

To uncouple the wheel, it will be sufficient to cause the rotation of the discs 2, 3, by turning the nut 7 in the opposite direction to that just described, thereby causing the angular displacement of the elements 1, against the periphery of said discs 2, 3, the balls 17 passing to the sockets 19, 19a, thereby displacing said balls which is facilitated by the resiliency of the element 8; the element 8 yields under the pressure exerted by the disc 2, allowing the displacement thereof and consequently the free displacement of the ball from one group of sockets to the other, and when the elements 1 are turned against the periphery of the elements 2, 3, the wheel is free and ready to be removed for repair or replacement.

From the above, it will be seen that a simple and efficient device has been provided, which requires no further explanation to those skilled in the art.

While I have described a particular embodiment of my invention for the purpose of illustration, it is clear that other modifications may be made without departing from the scope of the invention as clearly set forth in the appended claims.

What is claimed is:

1. A device for coupling wheels to axles comprising a hub flange, a series of bolts mounted on said flange having grooves therein, a wheel flange having apertures therein through which said bolts are adapted to project, spaced discs, latching elements pivotally connected to said discs and located between said discs, said latching elements at their free ends being forked to cooperate with said grooves and detent means cooperating with said latching elements for holding said elements in latched and unlatched position.

2. A device for coupling wheels to axles comprising a hub flange, a series of bolts mounted on said flange having grooves therein, a wheel flange having apertures therein through which said bolts are adapted to project, spaced discs having aligned openings therein, shafts located in said openings and latching elements pivoted on said shafts cooperating with said grooves to lock said wheel flange to said hub flange.

3. A device for coupling wheels to axles comprising a hub flange, a series of bolts mounted on said flange having grooves therein, a wheel flange having apertures therein through which said bolts are adapted to project, spaced discs, a plurality of latching elements pivotally mounted between said discs to cooperate with said grooves, a nut interconnecting said discs so as to rotate said discs, a jam nut cooperating with said nut and a bushing cooperating with said jam nut.

4. A device as set forth in claim 3 in which resilient means are interposed between said nut and jam nut.

5. A device as set forth in claim 1 in which said detent means comprises a ball carried by each latching element and said discs are provided with recesses cooperating with the balls of the latching elements.

ELDA GRACIANA BERGOLLI DE MANGHI.